F. L. MORSE.
SPROCKET CHAIN.
APPLICATION FILED JUNE 27, 1908.
953,428.
Patented Mar. 29, 1910.
2 SHEETS—SHEET 1.
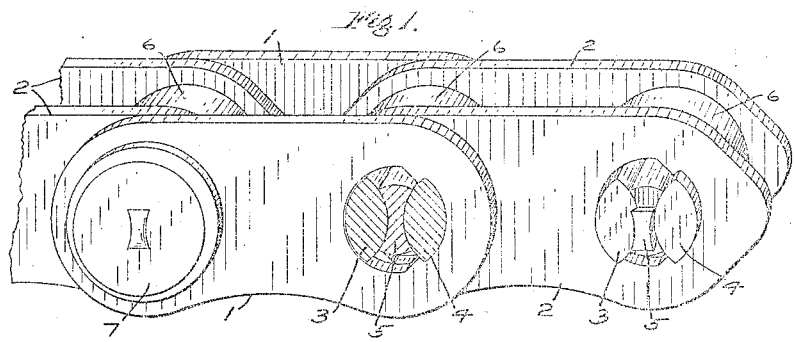
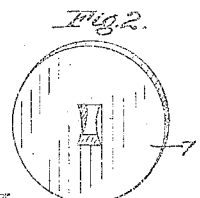
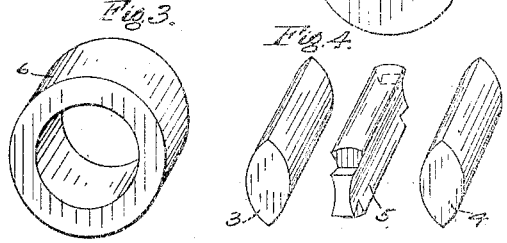
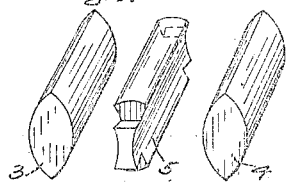
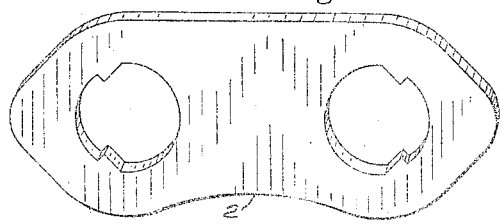
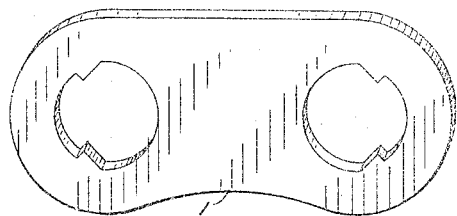
WITNESSES
Wm. M. Cady
J. C. Custer
INVENTOR
Frank L. Morse
by E. Wright
Att'y F. L. MORSE.
SPROCKET CHAIN.
APPLICATION FILED JUNE 27, 1908.
953,428.
Patented Mar. 29, 1910.
2 SHEETS—SHEET 2
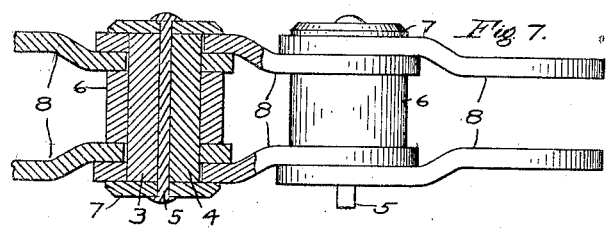
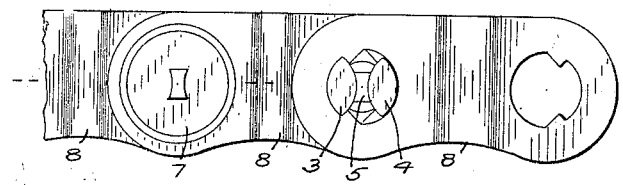
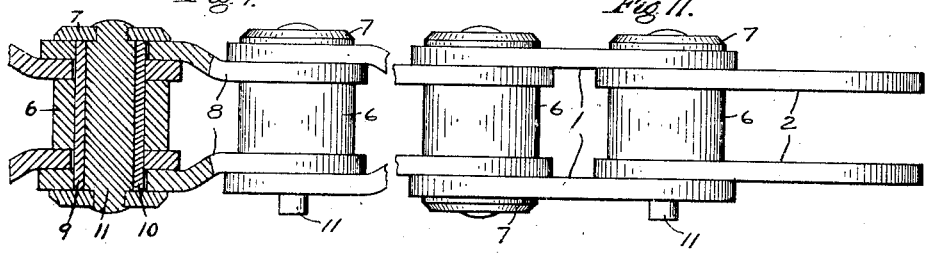
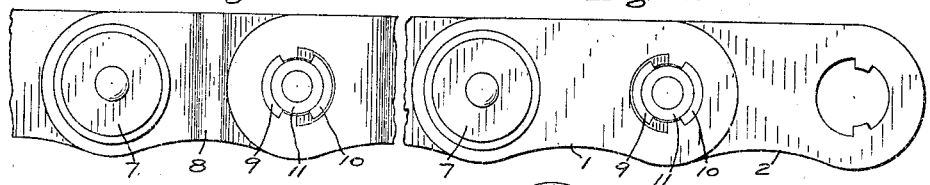
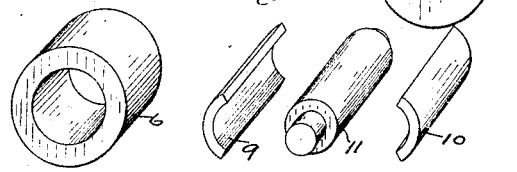
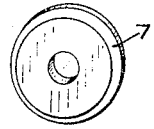
WITNESSES
Wm. M. Cady
J. S. Custer
INVENTOR
Frank L. Morse
by E. H. Wright
Atty

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

SPROCKET-CHAIN.

953,428.  Specification of Letters Patent.  Patented Mar. 29, 1910.

Application filed June 27, 1908. Serial No. 440,733.

*To all whom it may concern:*

Be it known that I, FRANK L. MORSE, a citizen of the United States, residing at Ithaca, in the county of Tompkins and State of New York, have invented new and useful Improvements in Sprocket-Chains, of which the following is a specification.

This invention relates to drive chains for sprocket wheels and more particularly to what is known as the open link type of chain in which the links are formed of side plates spaced apart and between which the teeth of the wheels are adapted to extend.

The principal object of my present invention is to provide an improved form of joint in chains of this class, by constructing the pintle of such joint in three parts which bear one upon another and extend through all of the plates of the two adjacent links at each joint, whereby the bearing surface between the relative movable parts of the joint, and also its shearing strength are greatly increased.

In the accompanying drawing Figure 1 is a perspective view of a few links of a chain embodying one form of my improvements, two of the joint washers being removed to show the pintle parts; Fig. 2 a perspective view of one of the joint washers; Fig. 3 a similar view of the spacing member or roller adapted to be mounted on the pintle between the side plates; Fig. 4 a similar view of the three pintle parts separated; Fig. 5 a perspective view of one of the plates of an inside link; Fig. 6 a similar view of one of the plates of an outside link; Fig. 7 a plan view partly in horizontal section, showing a portion of a chain having a modified form of links; Fig. 8 a side elevation of the same; Fig. 9 a plan view partly in horizontal section of a portion of a chain showing a modified form of pintles for the joints; Fig. 10 a side view of the same; Fig. 11 a plan view showing the links formed of straight outside and inside plates; Fig. 12 a side view of the same; and Fig. 13 a perspective view of the parts of the joint, including the washers and spacing roller, separated.

According to the construction shown in Figs. 1 to 6 I have illustrated one form of my improved three part pintle joint as applied to the type of chain having links formed of two straight side plates, the plates 1 of each alternate link being outside of the plates 2 of the adjacent links. The pintles are shown as formed in three parts comprising two similar or identical side parts 3 and 4 having convex bearing surfaces facing each other, and a central pin member 5 having two oppositely facing concave bearing surfaces engaging the side pintle parts throughout their full length. All three parts of the pintle extend through apertures formed in the ends of both the inside plates 2 and outside plates 1 of the two adjacent links at each joint whereby the bearing of the parts of the pintle one upon another extends the full width of the outside link and the shearing strength of the joint is determined by the combined sectional area of all three pintle parts.

The apertures at the ends of the inside link plates are so formed as to hold in place and turn with one of the side parts of the pintle but permit free movement of the other parts therein, and the apertures at the ends of the outside plates of the adjacent link are so formed as to hold in place and turn with the other side part of the pintle but permit free movement of the other pintle parts therein; all as clearly illustrated in Figs. 1, 5 and 6 of the drawing. The apertures in the plates are preferably so formed that the side pintle parts may be slipped through the same into place and the joints readily assembled or dissembled in a similar manner at any time desired, the central pin member being provided with a shoulder extending through and riveted to an outside washer 7 for holding the parts of the chain together at the joints.

The sectional form of the pintle parts is similar to that shown in my prior pending application Serial No. 355,041 filed January 31, 1907, but according to my present improvement the three part pintle joint is applied in connection with an open link type of chain having links formed of side plates spaced apart upon the pintles. The spacing member or roller 6 is mounted on the pintles between the two inside link plates for engaging the sprockets of the wheel, and the outside surfaces of the side pintle parts are preferably curved so as to form together substantially a cylindrical surface on which the roller is adapted to turn.

In Figs. 7 and 8 I have shown the same form of pintle applied to an open link chain having links composed of bent side plates 8 so that each link has one outside end and one inside end. The apertures at the inside end of the side plates are formed to hold in place and turn with one of the side pintle parts while the other side pintle part is fitted within the apertures of outside ends of the plates of the adjacent link and turns therewith.

Figs. 9 and 10 illustrate the same type of chain links having a modified form of three part pintle comprising two side parts 9 and 10 having concave bearing surfaces facing toward each other and a central cylindrical pin 11 interposed between the two side parts which bear upon opposite sides thereof. The apertures at the opposite ends of the plates are formed to hold in place one side part of the pintle and permit free movement of the other parts thereof and the central pin members 11 may have shouldered ends for riveting the washers 7 to hold the parts of the chain together.

Figs. 11 and 12 show the same form of three part pintle applied to a chain formed of links composed of straight outside and inside plates, the same as shown in Fig. 1.

With the form of three part pintle illustrated in Figs. 1 to 8 inclusive there is a relative movement between the bearing surfaces of the side pintle parts and the central pin member on both sides of the latter at each flexing of the joints of the chain as the same passes onto or off from the sprocket wheel, thereby causing a lateral sliding movement of the central member and producing an active bearing surface extending the full length of both sides of the central member of the pintle.

With the form of three part pintle shown in Figs. 9 to 13 inclusive, either one or both of the side pintle parts or bushings 9 and 10 may turn relative to the central pin 11, and the latter being cylindrical is also adapted to rotate within its bearings in the side parts.

In all of the different modifications shown the side plates of the chain are provided with apertures formed to engage and turn with one of the side parts of the three part pintle, and to provide clearance for the free movement of the other parts thereof, the pintle parts extending through the apertures in both outside and inside plates at each joint, and being laterally removable in said apertures when assembling or disassembling the links, whereby a bearing of one part of the pintle upon another throughout the full width of the outside links is obtained, and the joints may be readily assembled or detached as desired, the parts of the chain being held together at the joints preferably by riveting outside washers to one of the pintle members.

Having now described my invention, what I claim as new and desire to secure by Letters Patent is:—

1. A drive chain having links composed of side plates with apertures at their ends, pintles formed in three parts extending through said apertures, and a spacing member mounted on said pintle parts between the side plates for engaging the teeth of the sprocket wheel.

2. A drive chain having links composed of side plates with apertures at their ends, pintles formed in three parts extending through said apertures and bearing upon one another throughout the full width of the outside links, the pintle parts being laterally removable in said apertures, and a spacing member mounted on said pintle parts between the side plates for engaging the sprockets of the wheel.

3. A drive chain having links composed of side plates with apertures at their ends, pintles formed in three parts extending through said apertures and bearing upon one another throughout the full width of the outside links, the respective side pintle parts being held by and removable in the apertures of the plates of the adjacent links, and a spacing member mounted on said pintle parts between the side plates for engaging the sprockets.

4. A drive chain having links composed of side plates with apertures at their ends, pintles formed in three parts extending through said apertures and comprising two side parts having opposite convex bearing faces and an intermediate part having curved bearing faces for coöperating with said side pintle parts, and a spacing member mounted on the pintle parts between the side plates for engaging the sprockets of the wheel.

5. A drive chain having links composed of side plates with apertures at their ends, pintles formed in three parts, two of said parts having convex bearing faces and held in the apertures of the respective oppositely leading plates of adjacent links, and an intermediate part having opposite concave bearing surfaces located between the side parts and extending through said apertures, a spacing member mounted on the pintles between the side plates, and washers riveted to the outside of the joints for holding the parts together.

6. A drive chain having links composed of side plates with apertures at their ends, pintles formed in three parts extending through and laterally removable in said apertures, and bearing one upon another throughout the full length of the pintle parts, washers riveted to opposite ends of one of said pintle parts, and a spacing roller mounted on the pintle between the side plates.

In testimony whereof I have hereunto set my hand.

FRANK L. MORSE.

Witnesses:
R. F. EMERY,
WM. M. CADY.